(12) United States Patent
Barron

(10) Patent No.: US 9,067,714 B2
(45) Date of Patent: Jun. 30, 2015

(54) CLOSURE WITH ADAPTER

(75) Inventor: Dan Barron, Schaffhausen (CH)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/114,257

(22) PCT Filed: Mar. 2, 2012

(86) PCT No.: PCT/EP2012/053625
§ 371 (c)(1),
(2), (4) Date: Oct. 28, 2013

(87) PCT Pub. No.: WO2012/146423
PCT Pub. Date: Nov. 1, 2012

(65) Prior Publication Data
US 2014/0048557 A1 Feb. 20, 2014

(30) Foreign Application Priority Data

Apr. 26, 2011 (DE) .......................... 10 2011 017 509

(51) Int. Cl.
*B67D 1/00* (2006.01)
*B65D 47/06* (2006.01)
(Continued)

(52) U.S. Cl.
CPC ................ *B65D 47/06* (2013.01); *B65D 5/748* (2013.01); *B65D 75/5877* (2013.01)

(58) Field of Classification Search
CPC .... B65D 41/32; B65D 51/185; B65D 51/223; B65D 47/06; B65D 47/10; B65D 47/747; B65D 5/748; B65D 75/5877
USPC .................... 222/80, 81, 83, 89, 90, 91, 83.5, 222/153.01, 153.09, 566–570, 519–525; 220/267, 277, 278
See application file for complete search history.

(56) References Cited

U.S. PATENT DOCUMENTS 1,611,111 A * 12/1926 Frazier et al. .................... 222/90
3,247,957 A * 4/1966 Kemble ......................... 206/440
(Continued)

FOREIGN PATENT DOCUMENTS

DE 102006016113 8/2007
GB 2154991 9/1985
(Continued)

OTHER PUBLICATIONS

International Search Report for Application No. PCT/EP2012/053625 dated May 15, 2012 (2 pages).

*Primary Examiner* — J. Casimer Jacyna
*Assistant Examiner* — Benjamin R Shaw
(74) *Attorney, Agent, or Firm* — Michael Best & Friedrich LLP

(57) ABSTRACT

A device (1) is proposed which consists of a pouring nozzle (2) with a cylindrical circumferential wall (20) and with an internal thread (21) and a terminal flange (22), into which an adapter (3) can be screwed. The adapter (3) has an inlet end (30) with an external thread (32) and an outlet end (31) with a conical tube attachment (35). At least one combined perforating and cutting tooth (34) is formed integrally on its lower edge in the screwing-on direction. In order to achieve as high a sealing force as possible between the tubular bag (4) and the adapter (3), a special seal is proposed. To this end, the cylindrical circumferential wall (20) above the terminal flange (22) is guided into a double-walled region. The outer region forms an obliquely outwardly directed conical supporting-wall region (24) and the inner double-walled region (23) is formed by a likewise slightly conically designed but inwardly directed sealing skirt (25). Liquid which possibly tends to penetrate into the thread region while the sealing film is cut open is thus held back.

20 Claims, 2 Drawing Sheets

(51) Int. Cl.
*B65D 5/74* (2006.01)
*B65D 75/58* (2006.01)

(56) References Cited

U.S. PATENT DOCUMENTS

| | | | | |
|---|---|---|---|---|
| 6,053,360 A | * | 4/2000 | Rutter | 222/1 |
| 6,962,275 B2 | * | 11/2005 | deCler et al. | 222/570 |
| 7,951,109 B2 | * | 5/2011 | Anderson | 604/87 |
| 7,980,424 B2 | * | 7/2011 | Johnson | 222/83 |
| 2006/0261028 A1 | | 11/2006 | Dubach | |
| 2007/0205216 A1 | * | 9/2007 | Smith | 222/81 |
| 2008/0029540 A1 | * | 2/2008 | Johnson | 222/83 |
| 2009/0046958 A1 | * | 2/2009 | Keen et al. | 383/202 |
| 2010/0180773 A1 | * | 7/2010 | Hentzel et al. | 99/275 |

FOREIGN PATENT DOCUMENTS

| | | |
|---|---|---|
| JP | 56048965 A | 5/1981 |
| WO | 9505996 | 3/1995 |
| WO | 2004083054 | 9/2004 |

\* cited by examiner

CLOSURE WITH ADAPTER

BACKGROUND OF THE INVENTION

The present invention relates to a device for dispensing pourable media, in particular liquid or paste-like substances, which are aseptically packaged in a completely closed receptacle or, respectively, tubular bag. Said device consists of a pouring nozzle comprising a flange which is attached to the tubular bag, the pouring nozzle having an internal thread in a circumferential wall, a tubular adapter having an external thread at an inlet end that fits to the internal thread of the pouring nozzle, a conical, tapering tube attachment at an outlet end and a sealing collar disposed therebetween, wherein the end of the adapter which can be screwed into the pouring nozzle is provided with a means for opening the receptacle or, respectively, tubular bag.

The technology has been available for a long time for aseptically packaging liquid or paste-like substances in sealed receptacles, in particular in tubular bags. In order to open the receptacle, said receptacle or, respectively, tubular bag has to be cut open or pierced. Closures are accordingly known which are particularly suited to this end as, for example, is disclosed in the WIPO patent application WO 95/05996. In this case, a pouring nozzle comprising a flange is attached to the receptacle, wherein said pouring nozzle has an internal thread into which a piercing element with external thread is screwed, said piercing element having a plurality of cutting teeth or perforating teeth along the lowest edge thereof. A screw cap is disposed on the pouring nozzle, which when being initially unscrewed moves the piercing element downwards and thereby opens the receptacle. Such closures are particularly very common in the beverage industry. These receptacles are relatively rigid and thus a relatively large force is required for opening.

Tubular bags with aseptically filled liquids, in particular with a salt solution are frequently used particularly in medical technology, wherein said tubular bags are made from pure plastic and are accordingly flexible and can also accordingly be opened substantially easier. These tubular bags are intended for relatively small quantities in the magnitude of 300 ml to 1000 ml. The American patent U.S. Pat. No. 4,257,535 thus discloses, for example, a device for dispensing pourable media, which are aseptically packaged and have a pouring nozzle comprising a flange. A cup-shaped tap is inserted into said pouring nozzle, said tap having centrally a guide tube section that is open at both sides, into which an adapter can be inserted. The adapter has a pin of pointed design which can be pushed into the guide tube section and can pierce the film of the tubular bag. The opening thus formed is relatively small and the acting pressure in the tubular bag is relatively small. Even if the tubular bag is slightly compressed when piercing, only a relatively small increased static pressure builds up. Sealing problems occurring thereby are thus relatively small. A relatively similar solution is demonstrated by the American patent application 2008/0029540. In this case, the piercing adapter is additionally provided with perforating and/or cutting teeth. Sealing problems are also hardly relevant here. In addition, this solution is not meant for aseptically sealed receptacles. On the contrary, a plug-like cover is placed on the pouring nozzle, which cover in turn has a cup-shaped receiving area, which is, however, closed towards the receptacle by means of a membrane. The adapter, which is designed as a piercing element, pierces the membrane of the plug.

The Japanese patent application JP 56048965 A also demonstrates the same concept.

The British patent application, GB 215 4991 also discloses a device for dispensing pourable media, which are aseptically packaged in a completely sealed receptacle or, respectively, in a tubular bag. The concept demonstrated here corresponds to a great extent to the solution previously described; however a guide cylinder is in effect integrally formed in this case on the pouring nozzle by means of a bayonet connection. An injection piston is thereby connected via which the aseptically sealed receptacle can be cut open, and the special feature here is that this perforating piston has a check valve in the outlet thereof; and therefore the receptacle is emptied when applying negative pressure and it is ensured by means of the valve that a reflux does not occur. Finally, a device for dispensing pourable media is known from the Japanese patent application JP 58037805.

SUMMARY OF THE INVENTION

It is now the aim of the present invention to provide a device of the type mentioned above for receptacles which are suited to large volumes, which on the one hand entails the problem of higher pressures being present than with tubular bags for infusions, which also are accordingly manufactured from thicker films and thus require greater forces for opening that also lead to an increased internal pressure. This in turn requires a solution in which an improved sealing between the penetrating adapter and the pouring nozzle is to be achieved.

This aim is met by the device mentioned at the beginning of the application by virtue of the fact that the pouring nozzle has a cylindrical wall in the upper region, which wall passes into a double-walled region above the flange, said region comprising a supporting-wall region extending conically outwards and a conically inwardly directed, elastic, thin-walled, circumferential sealing skirt which is concentric thereto.

Further advantageous embodiments of the subject matter of the invention emerge from the dependent claims, and the significance and affect thereof are discussed in the subsequent description with reference to the attached drawings.

BRIEF DESCRIPTION OF THE DRAWINGS

A preferred exemplary embodiment is depicted in the drawings. In said drawings:

FIG. 3 shows a partial view of the device at an oblique angle from above once again in a perspective view, while

DETAILED DESCRIPTION

Figure 1:
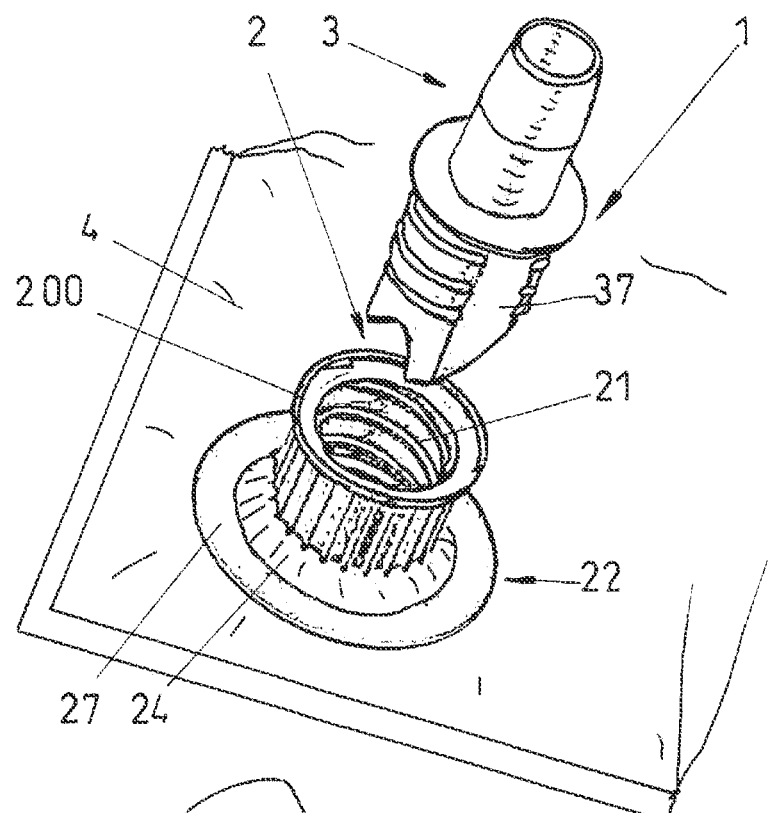
FIG. 1 shows the two individual parts of the inventive device for dispensing pourable media in an exploded view and FIG. 2 shows the same device in the assembled state in a perspective view at an oblique angle from below.

In FIG. 1, the device, which is denoted in the entirety thereof with the reference numeral 1, is depicted in a perspective exploded view. The device consists of two separate constituent parts, namely on the one hand a pouring nozzle 2 and on the other hand an adapter 3 which can be screwed therein. The pouring nozzle 2 is mounted to a receptacle 4 which is partially visible here and is depicted in a simplified manner. The receptacle 4 preferably consists of a tubular bag, in which liquid or paste-like substances are completely sealed and aseptically packaged. The tubular bag depicted here in a simplified manner relates to a so-called cushion-shaped tubular bag. Such tubular bags are used industrially or commercially for transporting liquid or paste-like media and said media are extracted in doses from said bags via a pump system. The device 1 is, of course, also suited to other embodiments of a tubular bag. In fact, the inventive device can definitely be mounted to ashlar-shaped receptacles made from laminated cardboard material. Such a receptacle is, however, relatively rigid and thus substantially smaller pressures also develop so that the sealing problem, which is solved by the present invention, no longer has the same relevance.

Figure 2:
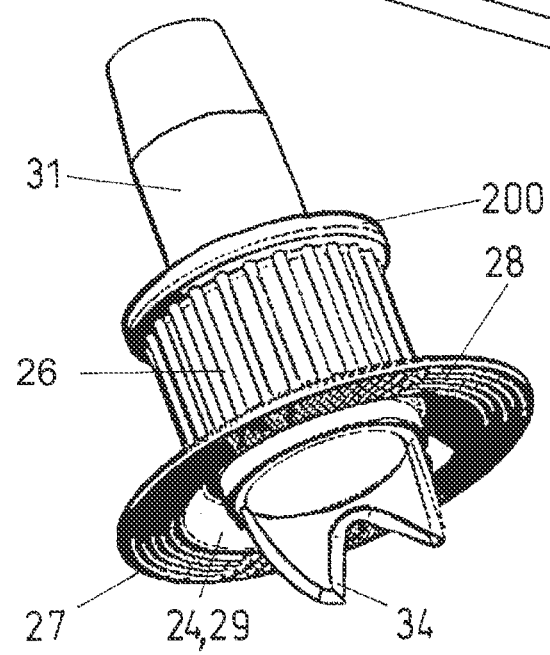

The pouring nozzle will now be described in detail with reference to FIGS. 1, 2 and 4. Said pouring nozzle comprises a cylindrical circumferential wall 20, which forms the actual spout, and an internal thread 21 that is disposed therein. In order to increase the grip, the cylindrical circumferential wall 20 is provided with ribbing 26 on the external side thereof. A supporting-wall region 24 extending conically outwards adjoins the cylindrical circumferential wall 20 at the lower end of the latter, said supporting-wall region than merging into an actual terminal flange 22 and extending perpendicularly to the central axis of the pouring nozzle 2. This outermost region of the terminal flange 22 forms an annular welding surface 27. In a preferred manner, the side of the welding surface 27 coming to rest at the tubular bag is provided with energy director elements 28. Such energy director elements are, however, not necessarily required depending on the welding procedure. The number and size of said energy director elements can also vary and said elements can also be configured in different shapes. Said energy director elements are particularly required if the welding is performed using ultrasound technology.

Figure 4:
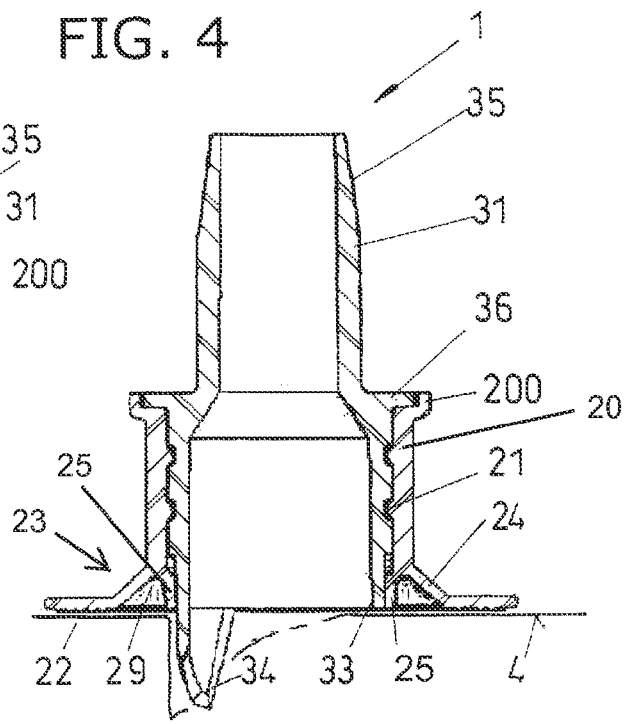
FIG. 4 shows a vertical diametral section of the device, in which the adapter is inserted into the pouring nozzle.

The supporting-wall region 24 which can be seen on the outside forms a part of a double-walled region 23, which can be easily recognized in FIG. 4. The internal proportion of the double-walled region 23 is formed by a sealing skirt 25 running concentrically with respect to the supporting wall 24. Said sealing skirt 25 runs, however, inclined slightly inwards instead of towards the outside. An annular chamber 29 remains between the supporting wall 24 and said sealing skirt 25.

The cylindrical circumferential wall (20) has an extension 200. Said extension 200 can be designed in a step-shaped manner as depicted here in FIG. 4 or conically as depicted in FIG. 1.

An adapter 3 can be screwed into the pouring nozzle 2. Said adapter 3 is of tubular design. A part which in the installation position can be screwed into the pouring nozzle forms the inlet end 30 while the part which rests on the outside of the pouring nozzle forms the outlet end 31. The outside diameter as well as the inside diameter of the inlet end 30 is larger than the corresponding diameters of the outlet end 31. The inlet end 30 is provided with an external thread 32. The lower end of the inlet end 30 is provided with a lower planar end surface 33. At least one combined perforating and cutting tooth 34 is formed integrally on said end surface and aligned with the cylindrical tube wall of the inlet end. As can be seen in FIGS. 1 and 2, more than just one perforating and cutting tooth can, of course, be used. In the example depicted here, two combined perforating and cutting teeth are always present. Because the cutting plane in FIG. 4 is set such that said plane runs exactly between the two teeth, only one perforating and cutting tooth can be seen. In principle but not of importance to the present invention, other tooth configurations are possible. In particular, the perforating tooth and the cutting tooth can also have separate forms that are designed differently.

The outlet end 31 has a conical taper on the outer surface and thus forms a tube attachment 35. A sealing collar 36 is formed integrally between the outlet end 31 and the inlet end 30. Said sealing collar 36 together with the aforementioned extension 200 forms a secondary seal. The extension 200 and the sealing collar 36 are accordingly matched in shape to one another. In the example depicted here, the sealing collar 36 is designed as a ring that is directed radially outwards; however, it is also possible to design this region conically. This, of course, than necessitates that the extension 200 has also to be conically designed in a mirror-inverted manner.

Depending on size and thickness of the film of the tubular bag, the adapter 3 can be completely screwed into the spout 2 by hand. Because, however, the outlet end 31 as well as the sealing collar 36 has a smooth surface, an adequate force can hardly be exerted. In the case of larger tubular bags, the wall thickness or more precisely the thickness of the film from which the tubular bag is produced is so large that this is not a problem. In this case, the adapter 3 is screwed for the time being into the inner thread 21 of the cylindrical circumferential wall 21 until the combined perforating and cutting tooth 34 rests on the film.

Figure 6:
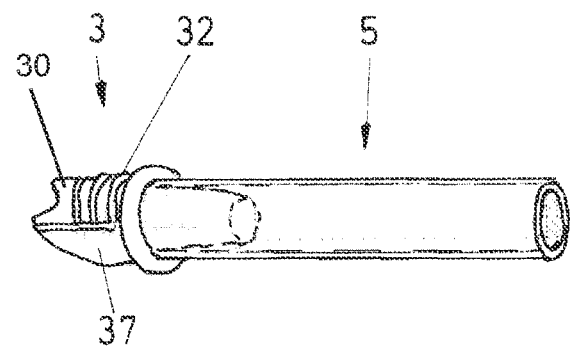
FIG. 6 shows the adapter with a coupling tube piece placed thereon.

As can be seen clearly in FIGS. 1 and 6, planar contact surfaces 37 are integrally formed on the inlet end 30, which are diametrically opposed to each other, so that the nozzle can be gripped and screwed in further using a tool, for example an open-end wrench, the corresponding films being cut in the process. Due to the relatively large and thin-walled sealing skirt 25 which is directed conically inwards, said sealing skirt is also able provide a seal on the contact surfaces 37. This sealing action is additionally assisted if when applicable the contents fit closely to the outer side of said sealing skirt 25 and thereby exert an additional sealing force. This additional sealing function occurs particularly if the adapter is completely screwed in and material is being pressed out of the tubular bag. When emptying the contents by means of a pump, a dispensing of said contents is often caused by a pressing power exerted on the tubular bag.

During use of the device 1, a torque can also act on the adapter 3 always in an unintended manner. Said torque can, for example, occur if a connecting tube 5 (see FIG. 6) is fastened to the tube attachment. A torque can also be transmitted via the connecting tube when fitting said connecting tube 5 to a counterpiece, for example to a pump or to a metering device. In order to thereby prevent the adapter 3 from loosening or even from being screwed out of the pouring nozzle to such an extent that a sealing connection no longer exists, it is proposed in a preferred manner to provide a corresponding locking means. Said locking means can be seen most clearly in FIG. 3. In this perspective partial view, an inwardly projecting detent cam 201 can be seen on the extension 200. A detent recess 38 is correspondingly formed on the sealing collar 36. When the adapter has been completely screwed into the pouring nozzle 2, the detent cam 201 engages into the detent recess 38 on the sealing collar 36. This locking means can, of course, in the most simple case be designed in reversed fashion by the extension 200 comprising a respective detent recess and a corresponding mirror-inverted detent cam being integrally formed on the sealing collar 36. Other quite common solutions for configuring such an antirotation lock can be implemented.

Figure 3:
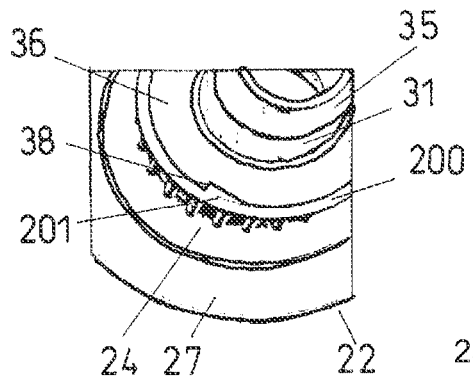

The adapter 3 as a separate part is typically separately and sterilely packaged and provided together with the receptacle or, respectively, the tubular bag. A connecting tube 5, which may already be fitted to the adapter 3 as shown in FIG. 3, can also be additionally provided in the same sterile or aseptic packaging.

Figure 5:
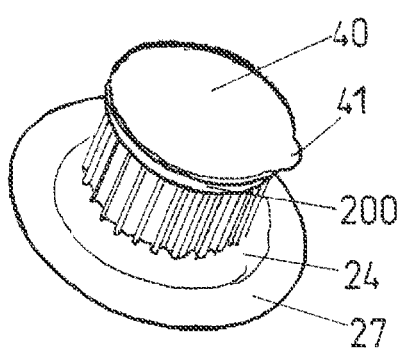
FIG. 5 shows the pouring nozzle by itself prior to initial use, said nozzle being provided with a covering film

The pouring nozzle 2, which is already mounted on the receptacle 4, can additionally be provided with a covering as is shown in FIG. 5. This can basically be a plug which is screwed into position and is thrown away after removal. This would, however, be an unnecessarily expensive variant which is also not very useful. The tubular bag is, as previously mentioned, aseptically sealed and the film of said tubular bag is sufficiently strong to prevent the destruction of the film in the region of the pouring nozzle 2. Accordingly, the pouring nozzle 2 could also remain completely open. According to the invention, said pouring nozzle 2 is sealed with a detachable film. This can, for example, be aluminum film that is adhesively bonded using peel-off lacquer. Such a detachable film covering 40 is depicted in FIG. 5. Said covering has the form of a rondelle comprising a peel-off tab 41. The adhesively bonded connection of the film covering 40 to the pouring nozzle 2 is effected on the end face of the extension 200. Instead of a connection of the film covering 40 to the extension 200 being effected by means of peel-off lacquer, this connection can, of course, also result from a thermal welding process. The film covering 40 ensures that contamination in the receptacle's interior cannot result, said interior being delimited by the cylindrical circumferential wall 20 of the pouring nozzle 2.

What is claimed is:

1. A device (1) for dispensing pourable media, which are aseptically packaged in a completely closed receptacle, comprising a pouring nozzle (2) with a flange which is configured to be attached to the receptacle, the pouring nozzle (2) having an internal thread (21) in a circumferential wall (20), a tubular adapter with an external thread, which fits to the internal thread of the pouring nozzle, at an inlet end (30), a conical, tapering tube attachment at an outlet end (31) thereof and a sealing collar disposed therebetween, wherein the end of the adapter (3) which can be screwed into the pouring nozzle (2) is provided with means for opening the receptacle, characterized in that the pouring nozzle has a cylindrical circumferential wall (20) in an upper region, which wall passes into a double-walled region (23) above the flange (22), said double-walled region comprising a supporting wall (24) running conically outwards and an elastic, thin-walled, circumferential sealing skirt which is concentric to said supporting wall and is inclined conically inwards, wherein the tubular adapter rotates about an axis of rotation to couple with the pouring nozzle (2), wherein the flange (22) extends radially along a plane perpendicular to the axis of rotation, and wherein the sealing skirt extends axially to the plane.

2. The device according to claim 1, characterized in that the adapter has a lower planar end surface (33) on the inlet end (30) thereof which is provided with the external thread (32), at least one combined perforating and cutting tooth being formed integrally on said end surface in alignment with a cylindrical tube wall of said inlet end.

3. The device according to claim 1, characterized in that the external thread on the adapter ends above the double-walled region in a completely screwed-in state.

4. The device according to claim 1, characterized in that the circumferential wall (20) of the pouring nozzle (2) has an extension in an uppermost region, in which extension the sealing collar of the adapter is completely accommodated in a screwed-in state.

5. The device according to claim 4, characterized in that the extension is designed in a step-shaped manner, and the sealing collar is formed in a mirror-inverted manner.

6. The device according to claim 4, characterized in that mirror-inverted locking means are affixed to the extension, said locking means preventing the pouring nozzle and adapter from unscrewing after the adapter has been completely screwed into the pouring nozzle.

7. The device according to claim 1, characterized in that prior to screwing in the adapter, the pouring nozzle is sealed by means of a detachable covering film.

8. The device according to claim 1, characterized in that a thermoplastic tube is fitted to the tube attachment on the adapter.

9. The device according to claim 1, characterized in that the external thread on the adapter ends above the sealing skirt in a completely screwed-in state.

10. The device according to claim 4, characterized in that the extension is conical, and the sealing collar is formed in a mirror-inverted manner.

11. The device according to claim 1, characterized in that the pouring nozzle is sealed by means of a detachable covering film.

12. The device according to claim 1, wherein the media are liquid or paste-like substances.

13. The device according to claim 1, wherein the flange (22) includes a lower surface defining the plane and wherein a lower end of the sealing skirt terminates at the plane.

14. A device (1) for dispensing pourable media, which are aseptically packaged in a completely closed receptacle, comprising a pouring nozzle (2) with a flange which is configured to be attached to the receptacle, the pouring nozzle (2) having an internal thread (21) in a circumferential wall (20), a tubular adapter with an external thread, which fits to the internal thread of the pouring nozzle, at an inlet end (30), a conical, tapering tube attachment at an outlet end (31) thereof and a sealing collar disposed therebetween, wherein the end of the adapter (3) which can be screwed into the pouring nozzle (2) is provided with means for opening the receptacle, characterized in that the pouring nozzle has a cylindrical circumferential wall (20) in an upper region, which wall passes into a double-walled region (23) above the flange (22), said double-walled region comprising a supporting wall (24) running conically outwards and an elastic, thin-walled, circumferential sealing skirt which is concentric to said supporting wall and is inclined conically inwards, characterized in that the circumferential wall (20) of the pouring nozzle (2) has an extension in an uppermost region, in which extension the sealing collar of the adapter is completely accommodated in a screwed-in state, and characterized in that mirror-inverted locking means are affixed to the extension, said locking means preventing the pouring nozzle and adapter from unscrewing after the adapter has been completely screwed into the pouring nozzle.

15. The device according to claim 14, characterized in that the adapter has a lower planar end surface (33) on the inlet end (30) thereof which is provided with the external thread (32), at least one combined perforating and cutting tooth being formed integrally on said end surface in alignment with a cylindrical tube wall of said inlet end.

16. The device according to claim 14, characterized in that the external thread on the adapter ends above the double-walled region in a completely screwed-in state.

17. The device according to claim 14, characterized in that the extension is designed in a step-shaped manner, and the sealing collar is formed in a mirror-inverted manner.

18. The device according to claim 1, characterized in that prior to screwing in the adapter, the pouring nozzle is sealed by means of a detachable covering film.

19. The device according to claim 1, characterized in that a thermoplastic tube is fitted to the tube attachment on the adapter.

20. The device according to claim 1, characterized in that the external thread on the adapter ends above the sealing skirt in a completely screwed-in state.

* * * * *